United States Patent
Helbing

(10) Patent No.: US 7,865,364 B2
(45) Date of Patent: Jan. 4, 2011

(54) AVOIDING REPEATED MISUNDERSTANDINGS IN SPOKEN DIALOG SYSTEM

(75) Inventor: Marc Helbing, Aachen (DE)

(73) Assignee: Nuance Communications, Inc., Burlington, MA (US)

( * ) Notice: Subject to any disclaimer, the term of this patent is extended or adjusted under 35 U.S.C. 154(b) by 799 days.

(21) Appl. No.: 11/429,496

(22) Filed: May 5, 2006

(65) Prior Publication Data

US 2007/0043561 A1 Feb. 22, 2007

Related U.S. Application Data

(60) Provisional application No. 60/677,927, filed on May 5, 2005.

(51) Int. Cl.
  *G01L 15/00* (2006.01)
  *G01L 15/22* (2006.01)
(52) U.S. Cl. .................. 704/257; 704/236; 704/252
(58) Field of Classification Search .................. None
  See application file for complete search history.

(56) References Cited

U.S. PATENT DOCUMENTS

| | | | | |
|---|---|---|---|---|
| 6,377,922 | B2 * | 4/2002 | Brown et al. | 704/251 |
| 7,162,422 | B1 * | 1/2007 | Bennett | 704/236 |
| 7,243,069 | B2 * | 7/2007 | Jaepel et al. | 704/235 |
| 7,340,466 | B2 * | 3/2008 | Odom et al. | 707/10 |
| 7,542,907 | B2 * | 6/2009 | Epstein et al. | 704/275 |
| 2002/0087307 | A1 * | 7/2002 | Lee et al. | 704/233 |
| 2003/0139921 | A1 * | 7/2003 | Byrd et al. | 704/10 |
| 2005/0177376 | A1 * | 8/2005 | Cooper et al. | 704/277 |

OTHER PUBLICATIONS

Ringger, E. et al. "Error correction via a post-processor for continuous speech recognition," Acoustics, Speech, and Signal Processing, 1996. ICASSP-96 vol. 1. Conference Proceedings., 1996 IEEE International Conference on.*

* cited by examiner

*Primary Examiner*—Matthew J Sked
(74) *Attorney, Agent, or Firm*—Wolf, Greenfield & Sacks, P.C.

(57) ABSTRACT

A method for improving speech recognition accuracy includes utilizing skiplists or lists of values that cannot occur because of improbability or impossibility. A table or list is stored in a dialog manager module. The table includes a plurality of information items and a corresponding list of improbable values for each of the plurality of information items. A plurality of recognized ordered interpretations is received from an automatic speech recognition (ASR) engine. Each of the plurality of recognized ordered interpretations each includes a number of information items. A value of one or more of the received information items for a first recognized ordered interpretation is compared to a table to determine if the value of the one of the received information items matches any of the list of improbable values for the corresponding information item.

22 Claims, 2 Drawing Sheets

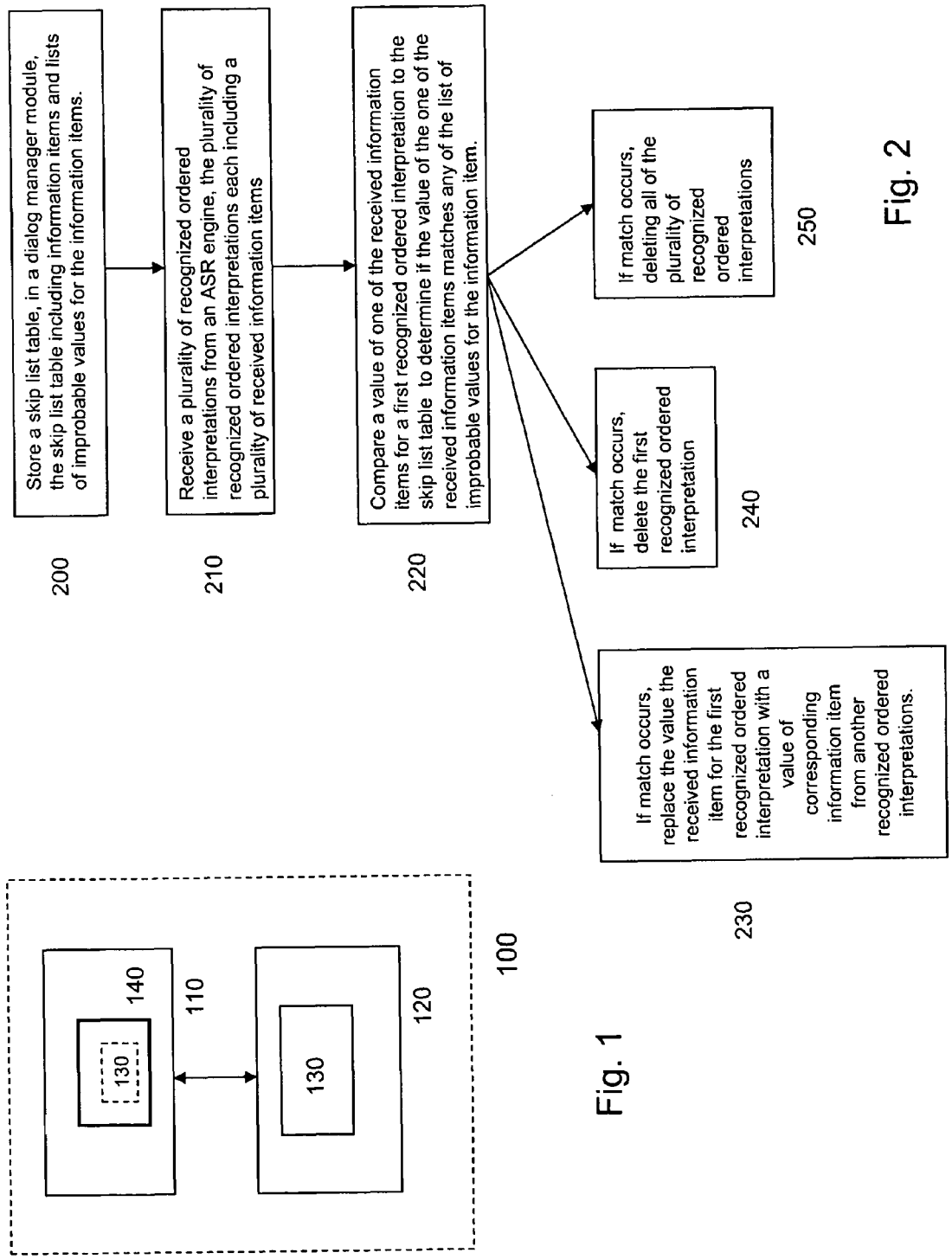

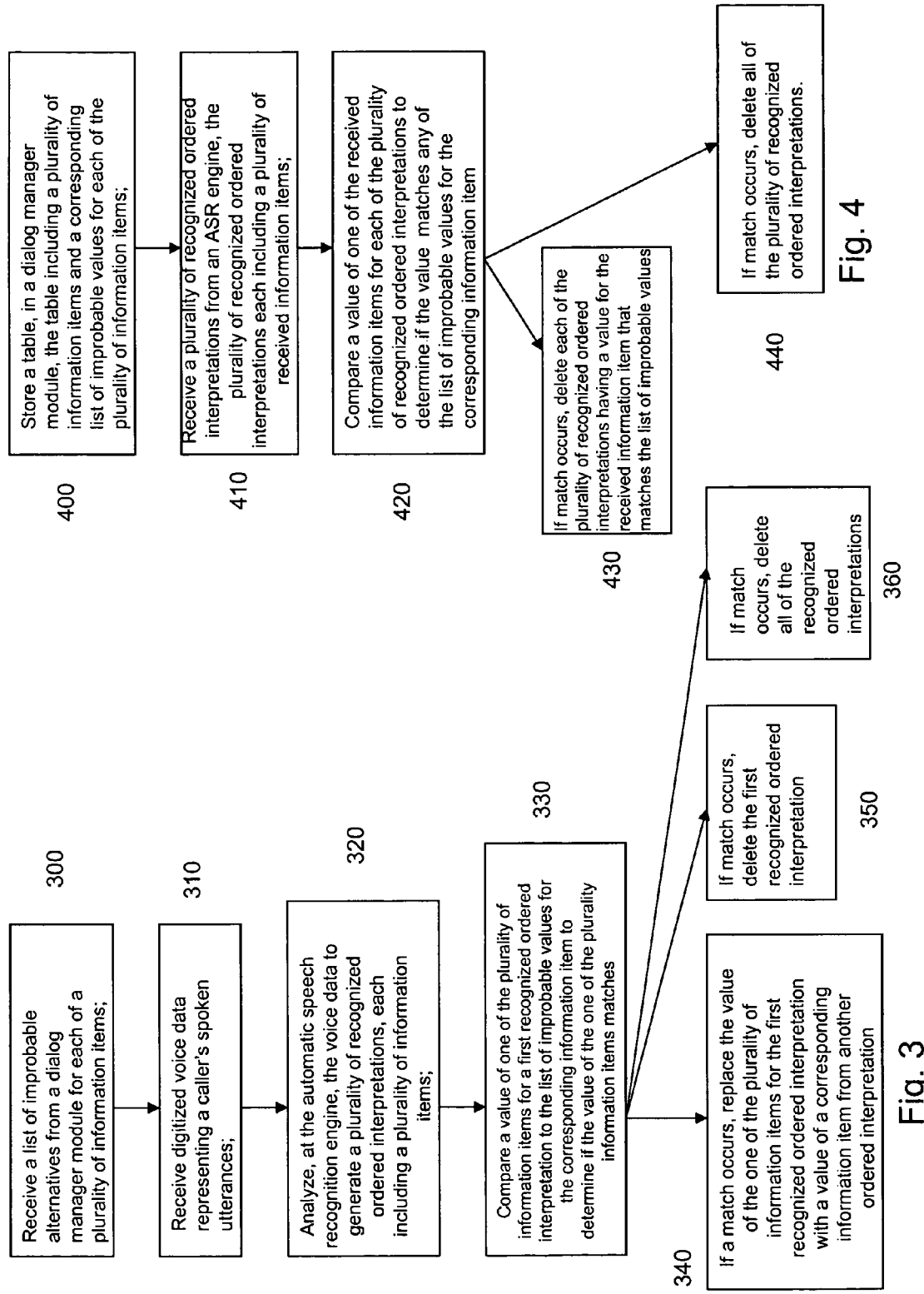

AVOIDING REPEATED MISUNDERSTANDINGS IN SPOKEN DIALOG SYSTEM

BACKGROUND OF THE INVENTION

1. Field of the Invention

In embodiments, there is disclosed a dialog manager configured to use knowledge from previous dialog turns to reduce the probability of misunderstandings in subsequent turns.

2. Background

Spoken computer-dialog systems in which a human caller is talking to a computer (e.g., through a telephone or other audio enabled device) are known. In such systems the computer is able to generate speech output, either as synthesized or prerecorded speech or a mixture of the two. The system may further feature an automatic speech recognition (ASR) engine, which analyzes sound data digitized from a caller's utterances. The ASR engine generates a speech recognition result which contains an ordered list of alternative interpretations. Each interpretation consists of one or more information items. The speech recognition result is then passed to a dialog manager for further analysis, at the end of which the dialog manager generates a textual output suitable for speech output generation.

An automatic speech recognizes can produce inaccurate results, especially for utterances that are acoustically similar. Usually, the dialog manager at some point in the conversation will generate a so-called confirmation question, which asks the caller to confirm or reject the information collected so far. If a misunderstanding occurs, the user is often prompted to repeat the information. During this repeated recognition turn, there is a high probability that the same mistake will occur again. This will give the caller an annoying experience.

DEFINITIONS

Following is a list of definitions:

"Dialog Step" consists of an initial question (system prompt), the caller's reply, plus an optional confirmation question and the users reply to it. For example:

System: Where do you want to fly to?
Caller: London
System: I heard you say London, correct?
Caller: yes "Misrecognition" is the first best result interpretation, but does not contain any or all of the information items or does not contain the correct values for all or any of the information item, or only contains them with confidence values below a reasonable threshold.

SUMMARY OF THE INVENTION

A dialog manager is configured to use knowledge from previous dialog turns to reduce the probability of misunderstandings in subsequent turns.

For each of the information items, the dialog manager may keep a (potentially empty) list of values that are highly improbable for an information item, or a "skip list." If in subsequent dialog turns an interpretation is given containing one of the values on the list for an information item, this knowledge can be used to determine the next action in the dialog. Among the possible actions are:

a) the current value of information item is rejected and another value for it from one of the other interpretations is used,
b) the current interpretation is rejected and one of the other interpretations is used,
c) all interpretations that contain the information item with one of the values on the skip list are rejected, and
d) all interpretations are rejected.

When the skip list is stored within the dialog manager, the disclosure encompasses two possible implementations for the processing of the skip lists.

In one implementation, the skip lists are processed by the dialog manager with the dialog manager using the skip lists to post-process the speech recognition result delivered by the ASR engine.

In the other implementation, the skip lists are processed by the ASR engine. With this implementation, the skip lists are processed in the ASR engine during the generation of the n-best alternatives. The dialog manager passes the current skip lists for all possible information items of the dialog or for those that can occur in the context of the current question. The number of interpretations in the speech recognition result in such implementation is limited for practical reasons. Compared to the first implementation, this way of implementing the skip list has the advantage that the recognizer can use interpretations that would normally not have been included in the result if interpretations are rejected due to skip list processing (in the first implementation, there would be the possibility that after removing these interpretations, the result would be empty).

BRIEF DESCRIPTION OF THE DRAWINGS

FIG. 1 illustrates a portion of an automatic speech recognition system according to an embodiment of the invention;

FIG. 2 illustrates a first method of utilizing skiplists in an automatic speech recognition system;

FIG. 3 illustrates a second method of utilizing skiplists in an automatic speech recognition system; and FIG. 4 illustrates a third method of utilizing skiplists in an automatic speech recognition system.

DETAILED DESCRIPTION

FIG. 1 illustrates a portion of an automatic speech recognition system according to an embodiment of the present invention. The automatic speech recognition (ASR) system includes an ASR engine 100 and a dialog manager module 120. The ASR engine 100 receives sound data digitized from a caller's utterances and outputs a number of ordered interpretations. Each of the ordered interpretations may include a number of information items. The information items may correspond to a phrase, a word, a term, etc. These may be referred to as recognized ordered interpretations because the ASR engine has recognized the speech. In an embodiment of the invention, the ordered interpretations may be ordered by a confidence factor the ASR engine has in the accuracy of the interpretation. The recognized interpretations may be ordered in other fashions, such as an temporal order in which the number of recognized interpretations were output. Under other operating conditions, the ASR system may identify one information item as more significant than the others, and the ASR system may order the interpretations based on the confidence value the ASR engine has in the accuracy of the interpretation of that one information item.

The dialog manager module 120 receives the list of recognized ordered interpretations. In one embodiment of the invention, the dialog manager module 120 includes a skiplist 130. The skiplist 130 may be a table that includes each of the information items and a corresponding list of values that are impossible or improbable for the information item to have. Illustratively, if the information item is a day, the skiplist may include words such as New York, America, any monetary amount, because these values are not probable or possible values for a day (like Tuesday, or May $5^{th}$ would be). The skiplist is utilized to help improve the accuracy of the speech recognition system 100. In an embodiment of the invention, the skiplist may be stored in a memory 140 of the ASR engine 110.

FIG. 2 illustrates a first method of utilizing skip lists in an automatic speech recognition system according to an embodiment of the present invention. In an embodiment of the invention, a skip list table, is stored 200 in a dialog manager module or subsystem. Alternatively, the skip list table may be stored in a memory. The skip list table includes information items and also lists of improbable and/or impossible values for the corresponding information items. A dialog manager module receives 210 a number of recognized ordered interpretations from the ASR engine. Each of the number of recognized ordered interpretations received from the ASR engine includes a number of received information items.

In an embodiment of the invention, the dialog manager module compares 220 a value of one of the received information items from a first recognized ordered interpretation to the skip list table. The comparison determines if the value of one of the received information items matches any of the list of improbable values for the corresponding information item.

In an embodiment of the invention, if a match occurs with the one of the received information items, the value of received information item for the first recognized ordered interpretation is replaced 230 with a value of a corresponding information item from another one of the number of recognized ordered interpretations.

In an embodiment of the invention, if a match occurs with one of the received information items, the first recognized ordered interpretation is deleted and/or discarded 240 and is not utilized by the dialog manager module. In this embodiment, another one of the number of recognized ordered interpretations is utilized.

In an embodiment of the invention, if a match occurs with one of the received information items, all of or a majority of the recognized ordered interpretations are discarded and/or deleted 250.

FIG. 3 illustrates a second method of utilizing skiplists in an automatic speech recognition system according to an embodiment of the present invention. In an embodiment of the invention, the skiplist processing is performed in the ASR engine. In this embodiment of the invention, a list of improbable alternatives is received 300 from a dialog manager module for each of a number of information items. In an embodiment of the invention, the ASR engine may receive 310 digitized voice data representing a caller's spoken words or utterances.

In this embodiment of the invention, the ASR engine analyzes 320 the digitized voice data to generate a plurality of recognized ordered interpretations. As noted above, the plurality of recognized ordered interpretations each include a plurality of information items. In an embodiment of the invention, the ASR engine compares 330 a value of one of the plurality of information items for a first recognized ordered interpretation to the list of improbable values for the corresponding information item. The comparison results in the determination of whether a value of the one of plurality of information items matches with one item on the list of improbable values.

In an embodiment of the invention, if a match occurs, the value of the one of the plurality of information items for the first recognized ordered interpretation is replaced 340 with a value of a corresponding information item from one of the other recognized ordered interpretations.

In an embodiment of the invention, if a match occurs, the first recognized ordered interpretation is deleted or discarded 350. Another of the plurality of recognized ordered interpretations is then utilized instead of the first recognized ordered interpretation.

In an embodiment of the invention, if a match occurs, then all of the recognized ordered interpretations are deleted or discarded 360.

FIG. 4 illustrates a third method of utilizing skiplists in speech recognition to improve accuracy according to an embodiment of the invention. In an embodiment of the invention, a skip list table is stored 400 in the dialog manager module. Illustratively, the skiplist table includes a plurality of information items and a corresponding list of improbable values for each of the plurality of information items. In this embodiment, the dialog manager module receives 410 a plurality of recognized ordered interpretations from the ASR engine. Each of the plurality of recognized ordered interpretations may include a plurality of received information items.

In an embodiment of the invention, the dialog manager module compares 420 a value of one of the received information items for each of the plurality of recognized ordered interpretations to determine if the value matches any of the list of improbable values for the corresponding information item. In other words, a field or entry in each of the recognized ordered interpretations is compared against the list of improbable values for the field or entry.

In an embodiment of the invention, if a match occurs for one or a number information items, each of the plurality of recognized ordered interpretations having the matching value is deleted or discarded 430. In this embodiment of the invention, additional recognized ordered interpretations may remain.

In an alternative embodiment of the invention, if a match occurs for one of the information items, all of the plurality of recognized ordered interpretations are deleted or discarded 440. In other words, in this embodiment, the speech recognition process may need to receive new interpretations. Similarly, in another embodiment of the invention, if a match occurs, a certain number of the plurality of recognized ordered interpretations could be discarded or deleted.

The present invention described above references flowchart illustrations of methods, apparatus, and computer program products. It will be understood that each block of the flowchart illustrations, and combinations of blocks in the flowchart illustrations, can be implemented by computer program instructions (as can any menu screens described in the Figures). These computer program instructions may be loaded onto a computer or other programmable data processing apparatus to produce a machine, such that the instructions which execute on the computer or other programmable data processing apparatus create instructions for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instructions which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks, and/or menus presented herein.

While the description above refers to particular embodiments of the present invention, it will be understood that many modifications may be made without departing from the spirit thereof. The accompanying claims are intended to cover such modifications as would fall within the true scope and spirit of the present invention. The presently disclosed embodiments are therefore to be considered in all respects as illustrative and not restrictive, the scope of the invention being indicated by the appended claims, rather than the foregoing description, and all changes that come within the meaning and range of equivalency of the claims are therefore intended to be embraced therein.

The invention claimed is:

1. A method for performing recognition of speech in reply to a prompt, the method comprising:
   storing a data set, in a dialog manager module, the data set including a plurality of information items and a corresponding set of one or more improbable values for each of the plurality of information items, the one or more improbable values for each of the plurality of information items comprising one or more values that are not valid for the information item based on a context of the prompt;
   receiving a plurality of recognized ordered interpretations from an automatic speech recognition (ASR) engine, the plurality of recognized ordered interpretations each including a plurality of received information items; and
   comparing a value of one of the plurality of received information items for a first recognized ordered interpretation to the data set to determine if the value of the one of the received information items matches any of the set of one or more improbable values for the information item.

2. The method of claim 1, further including replacing the value of the one of the received information items for the first recognized ordered interpretation with a value of a corresponding information item from one of other recognized ordered interpretations if the value of the one of the received information items matches a value of any of the set of one or more improbable values for the corresponding information item.

3. The method of claim 2, further including maintaining at least one other of the received information items for the first recognized ordered interpretation.

4. The method of claim 1, further including deleting the first recognized ordered interpretation if the value of the one of the received information items matches a value of any of the set of one or more improbable values for the corresponding information item.

5. The method of claim 4, further including comparing a value of one of the received information items for a next recognized ordered interpretation to the data set to determine if a match exists with any of the set of one or more improbable values for the corresponding information item; and
   utilizing the next recognized ordered interpretation if there is no match between the value of the received information item for the next recognized ordered interpretation and the one or more improbable values for the corresponding information item in the data set.

6. The method of claim 1, further including deleting all of the plurality of recognized ordered interpretations if the value of the one of the received information items for the first recognized ordered interpretation matches one of the set of one or more improbable values for the corresponding information item in the data set.

7. The method of claim 1, further including deleting a first two recognized ordered interpretations if the value of the one of the received information items for the first recognized ordered interpretation matches one of the set of one or more improbable values for the corresponding information item in the data set.

8. The method of claim 1, wherein the one or more improbable values for each of the plurality of information items comprise one or more values that are incongruous with the information item.

9. A method for performing recognition of speech in reply to a prompt, the method comprising:
   receiving a set of one or more improbable values from a dialog manager module for each of a plurality of information items, the one or more improbable values for each of the plurality of information items comprising one or more values that are not valid for the information item based on a context of the prompt;
   receiving voice data representing a caller's spoken utterance;
   analyzing, at the automatic speech recognition engine, the voice data to generate a plurality of recognized ordered interpretations, each of the plurality of recognized ordered interpretations including the plurality of information items; and
   comparing a value of one of the plurality of information items for a first recognized ordered interpretation to the set of one or more improbable values for the corresponding information item to determine if the value of the one of the plurality information items matches any of the set of one or more improbable values for the corresponding information item.

10. The method of claim 9, further including replacing the value of the one of the plurality of information items for the first recognized ordered interpretation with a value of a corresponding information item from one of other recognized ordered interpretations if the value of the one of the plurality of information items matches a value of any of the set of one or more improbable values for the corresponding information item.

11. The method of claim 10, further including maintaining at least one other of the received information items for the first recognized ordered interpretation.

12. The method of claim 9, wherein the one or more improbable values for each of the plurality of information items comprise one or more values that are incongruous with the information item.

13. The method of claim 9, further including deleting the first recognized ordered interpretation if the value of the one of the plurality of information items matches a value of any of the set of one or more improbable values for the corresponding information item.

14. The method of claim 13, further including comparing a value of one of the received information items for a next recognized ordered interpretation to the set of one or more improbable values determine if a match exists with any of the set of one or more improbable values for the corresponding information item; and
   utilizing the next recognized ordered interpretation if there is no match between the value of the one of the plurality of information items for the next recognized ordered interpretation and the set of one or more improbable values for the corresponding information item.

15. The method of claim 9, further including deleting all of the plurality of recognized ordered interpretations if the value of the one of the plurality of information items for the first recognized ordered interpretation matches one of the set of one or more improbable values for the corresponding information item.

16. The method of claim 9, further including deleting a first two recognized ordered interpretations if the value of the one of the plurality of information items for the first recognized ordered interpretation matches one of the set of one or more improbable values for the corresponding information item.

17. A method for performing recognition of speech in reply to a prompt, the method comprising:
storing a data set, in a dialog manager module, the data set including a plurality of information items and a corresponding set of one or more improbable values for each of the plurality of information items, the one or more improbable values for each of the plurality of information items comprising one or more values that are not valid for the information item based on a context of the prompt;
receiving a plurality of recognized ordered interpretations from an automatic speech recognition (ASR) engine, the plurality of recognized ordered interpretations each including a plurality of received information items; and
comparing a value of one of the plurality of received information items for each of the plurality of recognized ordered interpretations to the data set to determine if the value of the one of the plurality of received information items matches any of the set of one or more improbable values for the information item for each of the plurality of recognized ordered interpretations.

18. The method of claim 17, further including deleting each of the plurality of recognized ordered interpretations having a value for the one of the plurality of received information items that matches the set of one or more improbable values for the corresponding information item in the data set.

19. The method of claim 17, further including deleting all of the plurality of recognized ordered interpretations if one of the one or more values of the one of the plurality of received information items in one of the recognized ordered interpretations matches the set of one or more improbable values for the corresponding information item in the data set.

20. The method of claim 17, wherein the one or more improbable values for each of the plurality of information items comprise one or more values that are incongruous with the information item.

21. A computer-readable memory encoded with instructions that, when executed by a computer, cause the computer perform a method for recognition of speech in reply to a prompt, the method comprising:
storing a data set, in a dialog manager module, the data set including a plurality of information items and a corresponding set of one or more improbable values for each of the plurality of information items, the one or more improbable values for each of the plurality of information items comprising one or more values that are not valid for the information item based on a context of the prompt;
receiving a plurality of recognized ordered interpretations from an automatic speech recognition (ASR) engine, the plurality of recognized ordered interpretations each including a plurality of received information items; and
comparing a value of one of the plurality of received information items for a first recognized ordered interpretation to the data set to determine if the value of the one of the received information items matches any of the set of one or more improbable values for the information item.

22. A computer system comprising:
a data processing apparatus; and
computer-readable memory encoded with instructions that, when executed by the data processing apparatus, cause the computer system to perform a method for recognition of speech in reply to a prompt, the method comprising:
storing a data set, in a dialog manager module, the data set including a plurality of information items and a corresponding set of one or more improbable values for each of the plurality of information items, the one or more improbable values for each of the plurality of information items comprising one or more values that are not valid for the information item based on a context of the prompt;
receiving a plurality of recognized ordered interpretations from an automatic speech recognition (ASR) engine, the plurality of recognized ordered interpretations each including a plurality of received information items; and
comparing a value of one of the plurality of received information items for a first recognized ordered interpretation to the data set to determine if the value of the one of the received information items matches any of the set of one or more improbable values for the information item.

* * * * *